United States Patent
Tyan

(10) Patent No.: US 10,081,391 B1
(45) Date of Patent: Sep. 25, 2018

(54) BI-RECTANGULAR VEHICLE BEAM WITH CELLULAR STRUCTURE

(71) Applicant: FORD GLOBAL TECHNOLOGIES, LLC, Dearborn, MI (US)

(72) Inventor: Tau Tyan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/664,648

(22) Filed: Jul. 31, 2017

(51) Int. Cl.
*B62D 21/15* (2006.01)
*F16F 7/12* (2006.01)
*B60R 19/18* (2006.01)
*B60R 19/34* (2006.01)

(52) U.S. Cl.
CPC ............. *B62D 21/15* (2013.01); *B60R 19/18* (2013.01); *F16F 7/121* (2013.01); *B60R 19/34* (2013.01); *B60R 2019/1806* (2013.01); *B60R 2019/1866* (2013.01)

(58) Field of Classification Search
CPC .......... F16F 7/121; B60R 19/18; B60R 19/34; B60R 2019/1806; B62D 21/15
USPC ...................................... 293/102; 296/187.03
See application file for complete search history.

(56) References Cited

U.S. PATENT DOCUMENTS

| | | | |
|---|---|---|---|
| 8,336,933 B2 * | 12/2012 | Nagwanshi | B60R 19/34 188/371 |
| 8,459,726 B2 | 6/2013 | Tyan et al. | |
| 8,474,583 B2 | 7/2013 | Nagwanshi et al. | |
| 8,539,737 B2 | 9/2013 | Tyan et al. | |
| 8,641,129 B2 | 2/2014 | Tyan et al. | |
| 9,073,582 B2 | 7/2015 | Tyan et al. | |
| 9,126,628 B2 | 9/2015 | Tyan et al. | |
| 9,174,678 B2 | 11/2015 | Tyan et al. | |
| 9,187,127 B2 | 11/2015 | Tyan et al. | |
| 9,242,612 B2 | 1/2016 | Kawamata et al. | |

* cited by examiner

*Primary Examiner* — Dennis H Pedder
(74) *Attorney, Agent, or Firm* — Jason Rogers; Brooks Kushman P.C.

(57) ABSTRACT

A vehicle structural beam includes four inner walls, four outer walls, and a plurality of ribs. The four outer walls and the four inner walls respectively form outer and inner rectangular tubes. The inner tube is disposed within the outer tube such that the outer walls are non-parallel with the inner walls. Each of the plurality of ribs are disposed between the outer and inner walls. The plurality of ribs is arranged to define a plurality of triangular and/or quadrilateral cells between the outer and inner tubes.

18 Claims, 8 Drawing Sheets

BI-RECTANGULAR VEHICLE BEAM WITH CELLULAR STRUCTURE

TECHNICAL FIELD

The present disclosure relates to impact absorbing and structural beams utilized in vehicle body and frame structures.

BACKGROUND

Vehicle bodies and/or frames may include a variety of members that make up structure of the vehicle body or frame. For example, cross members may extend between longitudinal frame rails, pillars may support the vehicle roof and resist crush loads, bumper support beams may extend between a vehicle frame and front or rear bumpers to absorb energy associated with front or rear impacts. Increasingly stringent fuel and emissions standards have created the need to reduce the weight of vehicles. However, vehicle safety standards and ratings require strengthening of beams to increase absorption of energy and improve crash performance. The present disclosure is directed to achieving fuel economy driven weight reduction in vehicle beams and structural members while maximizing bending strength and energy absorption during a crash.

SUMMARY

A vehicle beam includes an inner tube, an outer tube, and a plurality of ribs. The outer and inner tubes respectively have outer and inner sets of walls that respectively form outer and inner rectangles. The inner tube is disposed within the outer tube such that the outer set of walls are non-parallel with the inner set of walls. Each of the plurality of ribs is disposed between the outer and inner sets of walls and has an end secured to one of the outer and inner sets of walls.

A vehicle bumper support beam includes four inner walls, four outer walls, and a plurality of ribs. The four outer walls and the four inner walls respectively form outer and inner rectangular tubes. The inner tube is disposed within the outer tube such that the outer walls are non-parallel with the inner walls. Each of the plurality of ribs are disposed between the outer and inner walls. The plurality of ribs is arranged to define a plurality of triangular cells between the outer and inner tubes.

A vehicle structural member includes four inner walls, four outer walls, and a plurality of ribs. The four outer walls and the four inner walls respectively form outer and inner square tubes. The inner and outer walls are oriented such that the inner walls are positioned at substantially 45° relative to adjacent outer walls. Each of the plurality of ribs are disposed between the outer and inner walls. The plurality of ribs is arranged to define a plurality of triangular cells between the outer and inner tubes.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
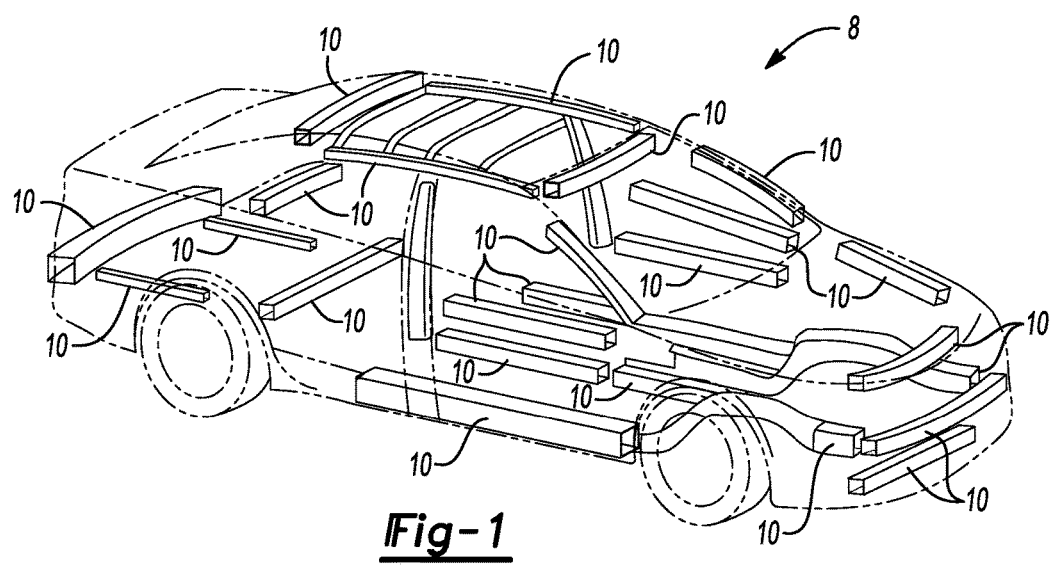
FIG. 1 is a perspective view of first embodiment of a vehicle.
Figure 2:
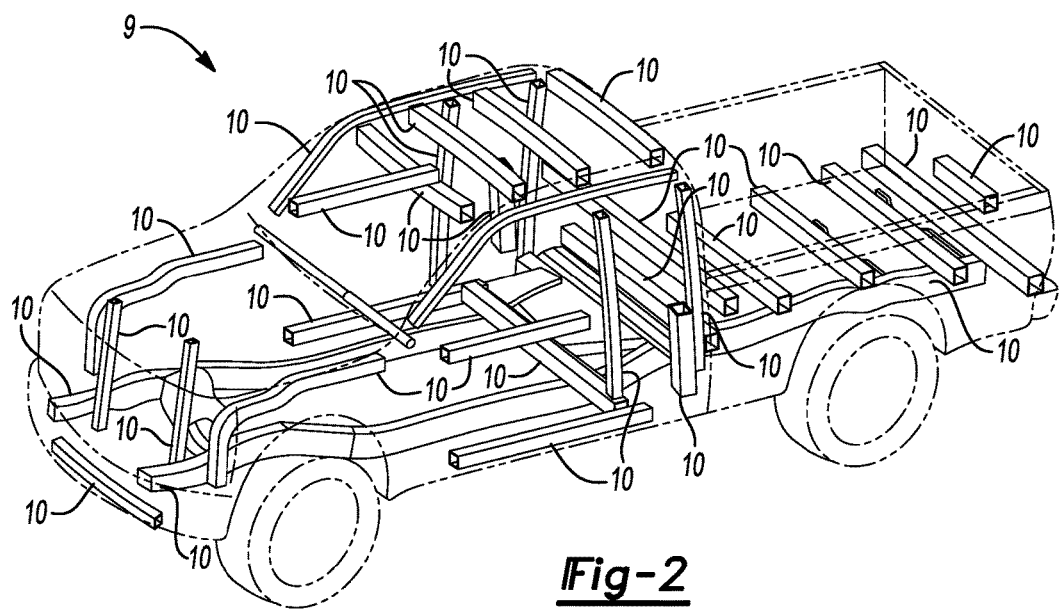
FIG. 2 is a perspective view of second embodiment of a vehicle.

Referring to FIG. 1, a perspective view of a vehicle frame 8, particularly a sedan, is illustrated. The vehicle frame 8 includes multiple non-parallel bi-rectangular cellular beams (or structural members) 10 according to at least one embodiment of this disclosure. FIG. 2 is a perspective view of a vehicle frame 9, particularly a truck, including multiple non-parallel bi-rectangular cellular beams 10 according to at least one embodiment of this disclosure. Within each vehicle frame 8, 9, the non-parallel bi-rectangular cellular beams 10 may be implemented in various components, including but not limited to, a crush can, a front rail, a front side rail, a rear side rail, a rear rail, a frame cross member, a shotgun, a hinge-pillar, an A-pillar, a B pillar, a C-pillar, a D-pillar, a door beam, a cross car beam, a front header, a rear header, a cow top, a roof rail, a lateral roof bow, a longitudinal roof bow, a body cross member, a back panel cross member, a rocker, an underbody cross member, a beltline, an IP cross-car beam, a firewall, a radiator core support, powertrain component supports (e.g., engine or transmission supports), strut or shock towers, a front bumper support, a rear bumper support, or any other component of the vehicle body-in-white structure or the frame known in the art.

Although the multiple non-parallel bi-rectangular cellular beams 10 are shown implemented within a vehicle frame, the beams may also be implemented in other applications, including but not limited to, aircraft, space craft, marine vehicles, high speed trains, other primary movers, or building applications requiring high energy absorbing or lightweight structures.

Figure 3A:
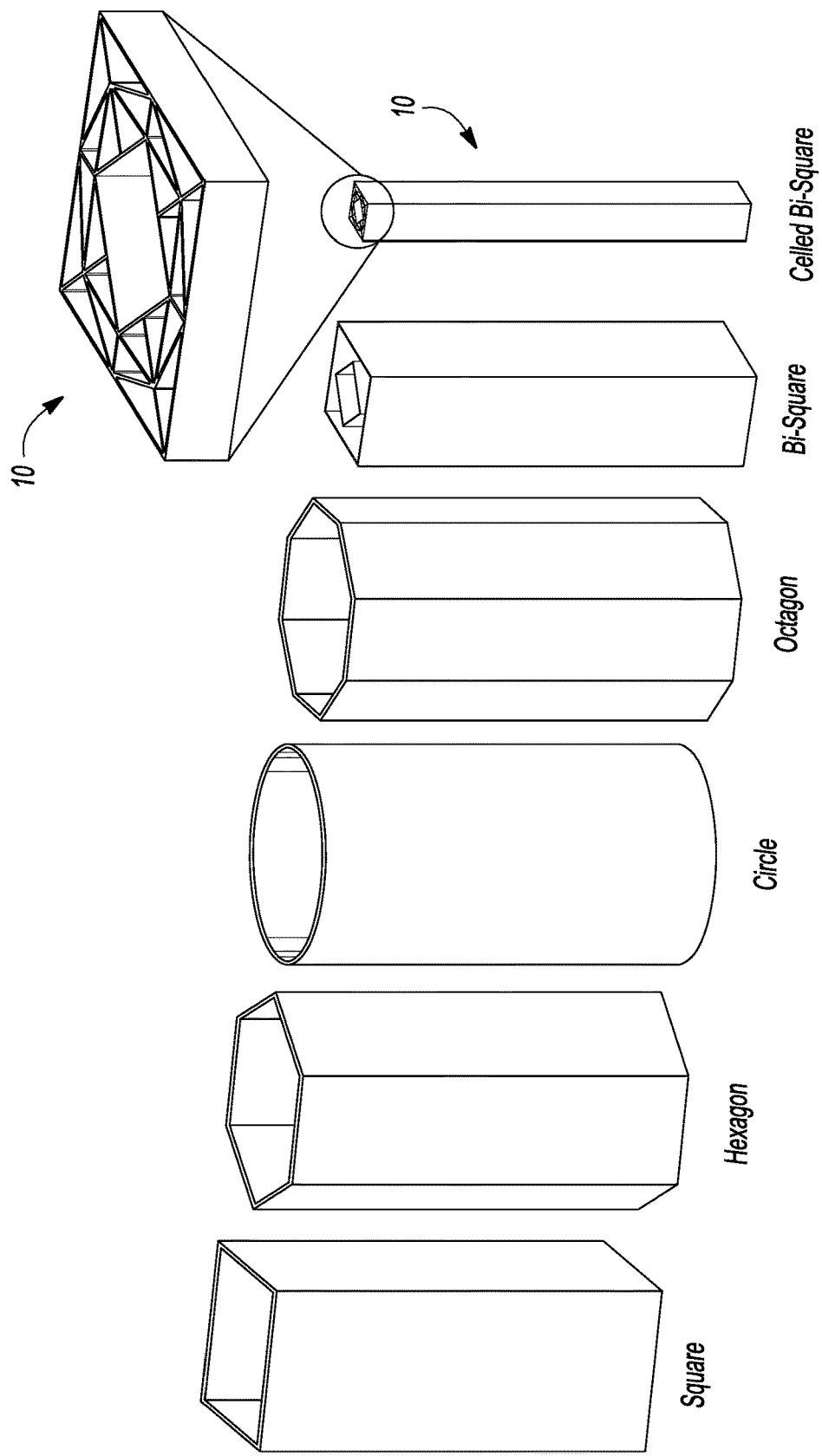
FIG. 3A is a perspective view of structural beams having varying cross-sections with the same mass.
Figure 3B:
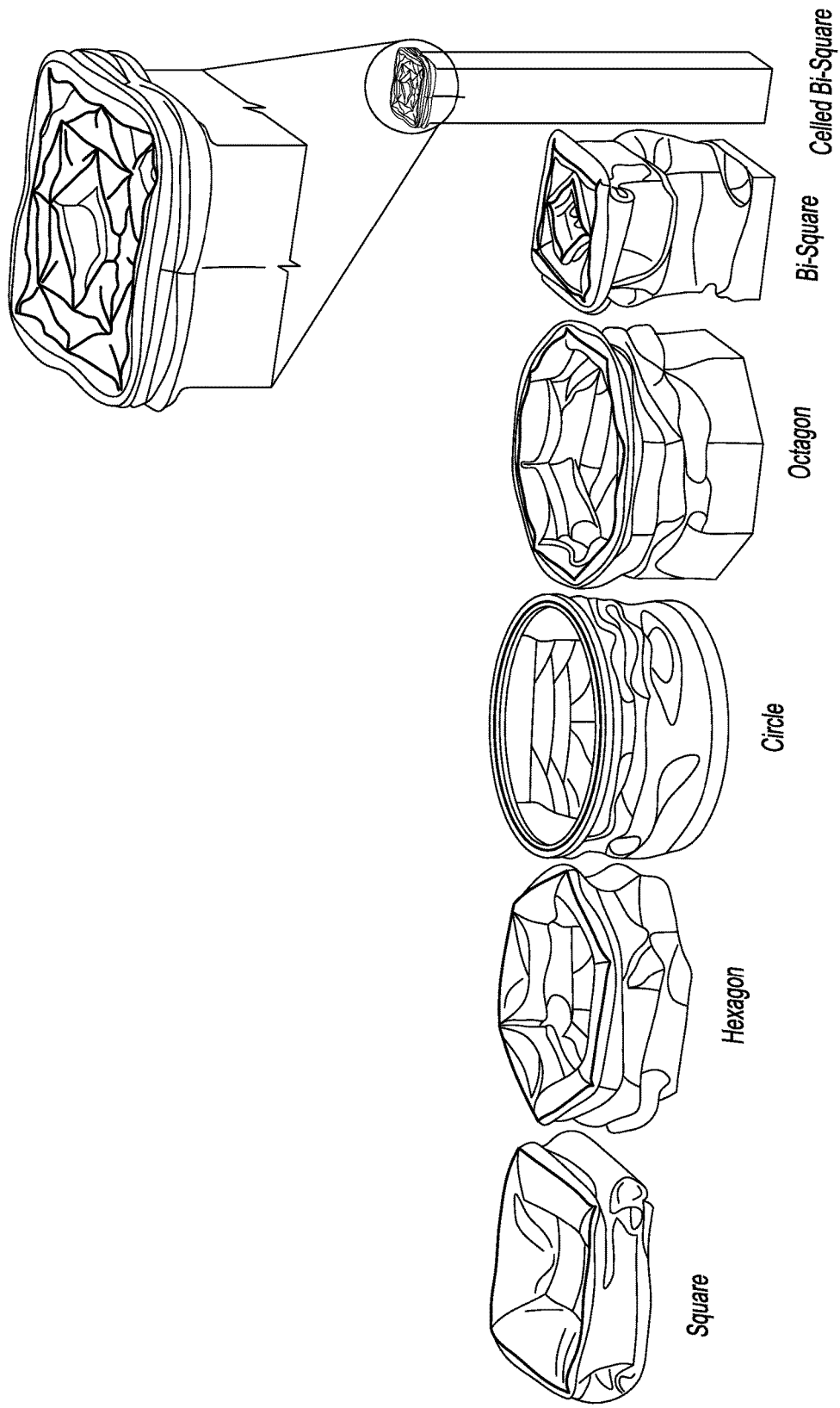
FIG. 3B and an exemplary axial collapse of the structural beams depicted in FIG. 3A.

Referring to FIGS. 3A-3B, a perspective view of structural members of varying cross-sections and an exemplary axial collapse of the structural members of varying cross-sections are, respectively, illustrated. More specifically, FIG. 3B show comparisons of the average crush force and crash energy absorption of beams having square, hexagonal, circular, octagonal, non-parallel bi-rectangular, and non-parallel bi-rectangular cellular cross-sections during an impact with a rigid wall at 35 mph. The non-parallel bi-rectangular cellular beam 10 demonstrated the shortest crush distance and smallest folding length. Moreover, the non-parallel bi-rectangular cellular beam 10 also demonstrated the most stable axial collapse and the highest energy absorption. In fact, the non-parallel bi-rectangular cellular beam 10 can achieve approximately 570% increase in average crush force or crash energy absorption over a square cross-section and about 400-430% increase in average crush force or crash energy absorption over octagonal and circular cross-sections. Each of the structural members shown have identical material, material thickness, perimeter, height, mass, impactor mass, impact speed, and boundary conditions.

Figure 3C:
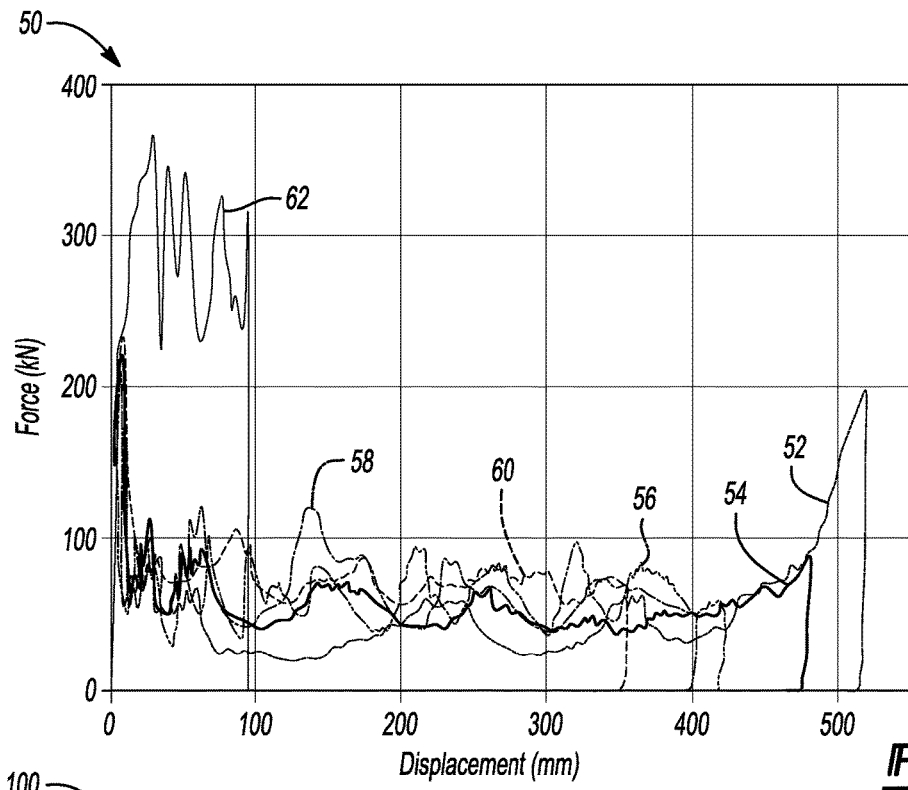
FIG. 3C is a graph comparing the dynamic crush force for several beams having cross-sections corresponding to FIGS. 3A and 3B

Referring to FIG. 3C, a dynamic crush force chart is identified by reference numeral 50. The crush force chart provides a comparison of beams made in accordance with the embodiment of FIGS. 3A-3B. The beams tested were of identical material, material thickness, perimeter, height, and mass but had different shapes. In the crush force chart 50, line 52 illustrates the crush performance of a square beam. Line 52 indicates that the displacement of a square beam in response to an average axial crush force of 49.45 kN is approximately 520 mm. Line 54 illustrates the crush performance of a hexagonal beam. Line 54 indicates that the displacement of a hexagonal beam in response to an average axial crush force of 56.22 kN is approximately 475 mm. Line 56 illustrates the crush performance of a circular beam. Line 56 indicates that the displacement of a circular beam in response to an average axial crush force of 65.36 kN is approximately 415 mm. Line 58 illustrates that the crush energy performance of an octagonal beam. Line 58 indicates that the displacement of an octagonal beam in response to an average axial crush force of 69.08 kN is approximately 400 mm. Line 60 illustrates that the crush performance of a non-parallel bi-square beam without a celled structure. Line 60 indicates that the displacement of a non-parallel bi-square beam in response to an average axial crush force of 78.08 kN is approximately 350 mm. Line 62 illustrates the performance of a non-parallel bi-square beam with a celled structure made according to FIG. 4. Line 62 indicates that the displacement of a non-parallel bi-square beam with a celled structure in response to an average axial crush force of 282.81 kN is approximately 100 mm.

Figure 3D:
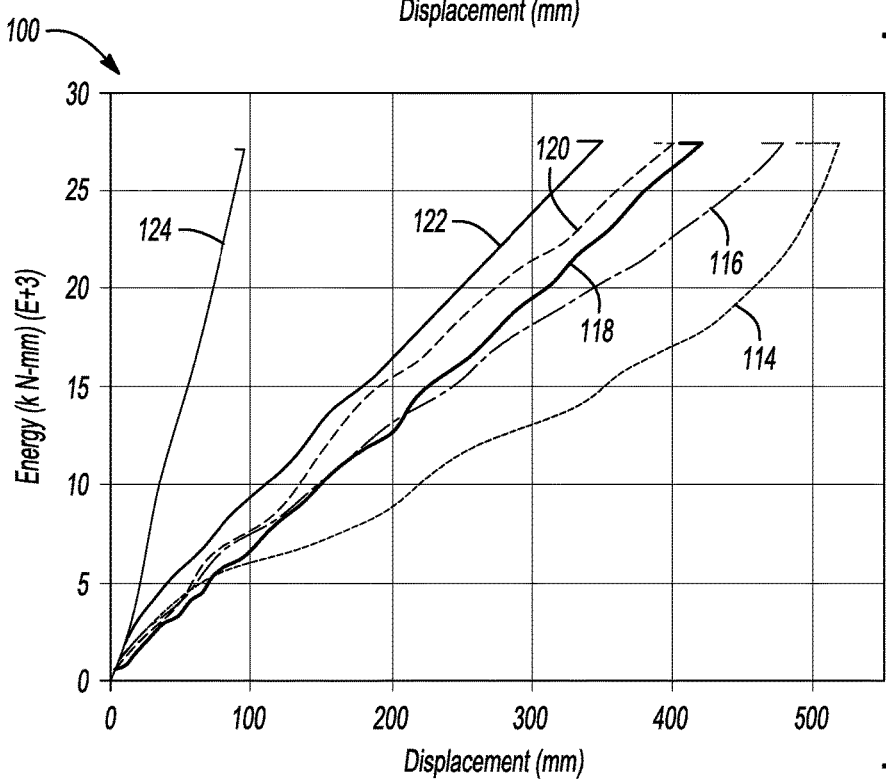
FIG. 3D is a graph comparing crush energy absorption for several beams having cross-sections corresponding to FIGS. 3A and 3B.

Referring to FIG. 3D, a dynamic crush energy chart is identified by reference numeral 100. The crush energy chart provides a comparison of beams made in accordance with the embodiment of FIGS. 3A-3B. The beams tested were of identical material, material thickness, perimeter, height, and mass but had different shapes. In the crush energy chart 100, line 114 illustrates the crush performance of a square beam. Line 114 indicates that the displacement of a square beam in response to an axial crush energy of 27,500 kN-mm is approximately 520 mm. Line 116 illustrates the crush performance of a hexagonal beam. Line 116 indicates that the displacement of a hexagonal beam in response to an axial crush energy of 27,500 kN-mm is approximately 475 mm. Line 118 illustrates the crush performance of a circular beam. Line 118 indicates that the displacement of a circular beam in response to an axial crush energy of 27,500 kN-mm is approximately 415 mm. Line 120 illustrates that the crush energy performance of an octagonal beam. Line 120 indicates that the displacement of an octagonal beam in response to an axial crush energy of 27,500 kN-mm is approximately 400 mm. Line 122 illustrates that the crush performance of a non-parallel bi-square beam without a celled structure. Line 122 indicates that the displacement of a non-parallel bi-square beam in response to an axial crush energy of 27,500 kN-mm is approximately 350 mm. Line 124 illustrates the performance of a non-parallel bi-square beam with a celled structure made according to FIG. 4G. Line 124 indicates that the displacement of a non-parallel bi-square beam with a celled structure in response to an axial crush energy of 27,500 kN-mm is approximately 100 mm.

Figure 4:
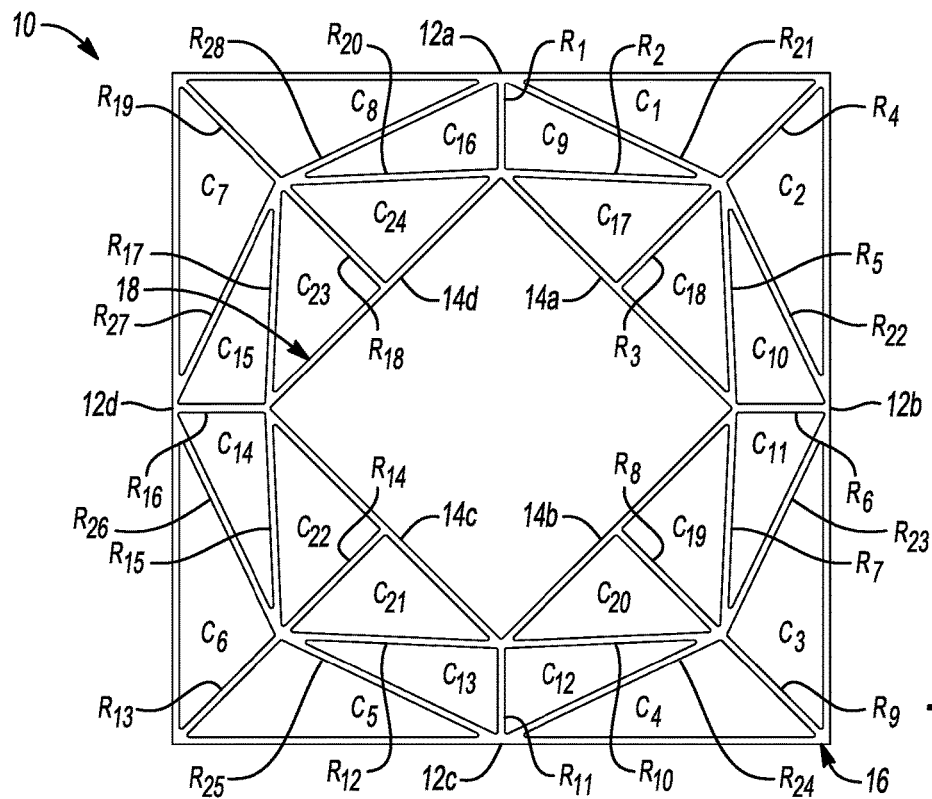
FIGS. 4 and 5 are plans views of a first embodiment of a structural beam.

Referring to FIG. 4, a non-parallel bi-rectangular cellular beam 10 according to one embodiment of this disclosure, is illustrated. The non-parallel bi-rectangular cellular beam 10 includes four outer walls 12a-12d that connect at four corners and four inner walls 14a-14d that connect at four corners. The four outer walls 12a-12d form an outer rectangular tube 16. The four inner walls form an inner rectangular tube 18. The inner rectangular tube 18 may be disposed within the outer rectangular tube 16 such that the outer walls 12a-12d are non-parallel with the inner walls 14a-14d. More specifically, the inner walls 14a-14d and the outer walls 12a-12d may be oriented such that the inner walls 14a-14d are positioned at substantially 45° relative to adjacent outer walls 12a-12d. Substantially 45° may refer to any incremental value between 40° and 50°. When referring to a specific inner wall, the adjacent outer walls include the outer walls that the specific inner wall would intersect if extended. For example, when referring to inner wall 14a, the adjacent outer walls would include outer wall 12a and outer wall 12b. The outer rectangular tube 16 and the inner rectangular tube 18 may more specifically be square tubes. The shape of the rectangular tubes may include slight deviations from exactly rectangular or exactly square. For example, the corners of the tubes may form angles that range from 85° to 95°, which is a slight deviation from 90°. The outer and inner walls or sides 12a-12d and 14a-14d, respectively, may have various lengths and thickness to meet strength and weight requirements. In one or more embodiments, the inner walls 14a and 14c may be longer than the inner walls 14b and 14d, and vice versa. The outer walls 12a and 12c may be longer than the outer walls 12b and 12d and vice versa.

Ribs $R_1$-$R_{28}$ are disposed between the inner walls 14a-14d and the outer walls 12a-12d of the non-parallel bi-rectangular cellular beam 10. The ribs $R_1$-$R_{28}$ may also be referred to as segments, webs, walls, web links, or interstitial web links. The ribs or segments $R_1$-$R_{28}$ may vary in thickness to alter the compressive strength of the beam. In addition to the thickness, the length and orientation of the ribs are tunable parameters that allow the beam to be fine-tuned to control crush strength and bending resistance. These parameters may also be tuned to create preferred crush and bending modes for structures that are not uniform or not straight.

Ribs $R_1$, $R_6$, $R_{11}$, and $R_{16}$ (which are referred to as a first subset of ribs) each extend between and are secured to a midpoint of an outer wall 12a-12d and a corner of the inner tube 18. Rib pairs $R_3$/$R_4$, $R_8$/$R_9$, $R_{13}$/$R_{14}$, and $R_{18}$/$R_{19}$ (which may be referred to as a second subset of ribs or a subset of rib pairs) each extend between and are secured to a corner of the outer tube 16 and a midpoint of an inner wall 14a-14d. The rib pairs may alternatively be a single rib that extends between and is secured to a corner of the outer tube 16 and a midpoint of an inner wall 14a-14d. Ribs $R_2$-$R_5$, $R_{12}$-$R_{15}$, $R_{17}$-$R_{28}$ (which may be referred to as a third subset of ribs) each extend between and are secured at to one of the inner walls 14a-14d of the inner tube 18 or one of the outer walls 12a-12d of the outer tube 16 and one of the other ribs $R_1$-$R_{28}$. Each rib $R_1$-$R_{28}$ is disposed between the inner walls 14a-14d of the inner tube 18 and the outer walls 12a-12d of the outer tube 16. Each rib $R_1$-$R_{28}$ also includes at least one end that is secured to either one of the inner walls 14a-14d or one of the outer walls 12a-12d. Alternative embodiments may include ribs that extend solely between two other ribs. Further alternative embodiments may include ribs that extends between two of an inner wall, outer wall, or another rib, that are secured to either the inner tube 18 or the outer tube 16 at a position other than a corner of the tube or midpoint of one of the tube walls.

The ribs $R_1$-$R_{28}$, the inner walls 14a-14d, and the outer walls 12a-12d of the non-parallel bi-rectangular cellular beam 10 form an exterior layer of triangular cells $C_1$-$C_8$, an intermediate layer of triangular cells $C_9$-$C_{16}$, and an interior layer of triangular cells $C_{17}$-$C_{24}$. The exterior layer of triangular cells $C_1$-$C_8$ may form scalene triangles, while the intermediate layer of triangular cells $C_9$-$C_{16}$ and interior layer of triangular cells $C_{17}$-$C_{24}$ may form right triangles. Although the embodiment of FIG. 4 depicts a particular configuration, the triangular cells $C_1$-$C_{24}$ in alternative embodiments may form any type of triangle including scalene, isosceles, equilateral, acute, obtuse, and right triangles. Also, although not depicted in the embodiment of FIG. 4, some of the cells may form quadrilateral cells including any type of quadrilateral such trapezoids, parallelograms, kites, rhombuses, squares, rectangles, concave quadrilaterals, and convex quadrilaterals. The cells and the configuration of ribs, weblinks, or segments is repeated radially around the non-parallel bi-rectangular cellular beam 10. While the ribs or segments are shown, and described above as being repeated radially around the non-parallel bi-rectangular cellular beam 10, some ribs and segments may be removed all together.

The beam or structural member 10 may have a fixed cross-sectional profile formed by an extrusion process. The extrusion process may generally include heating a stock material, loading the heated stock material into a press, and forcing the material through a die via the press to obtain the fixed cross-sectional profile. Furthermore, the side lengths and configurations, and/or degrees of the internal and external angles, of the present teachings can achieve a similar, if not greater, strength increase via thickening the corners or intersections where separate segments are connected, while minimizing mass per unit length of the member and maintaining a high manufacturing feasibility because the member can be formed by stamping, press forming, hydro-forming, molding, die casting, 3-D printing, or extrusion. The beam or structural member 10 may be made of various materials, including but not limited to steel alloys, aluminum alloys, magnesium alloys, thermoplastic, thermoset plastic, and ceramics.

Figure 5:
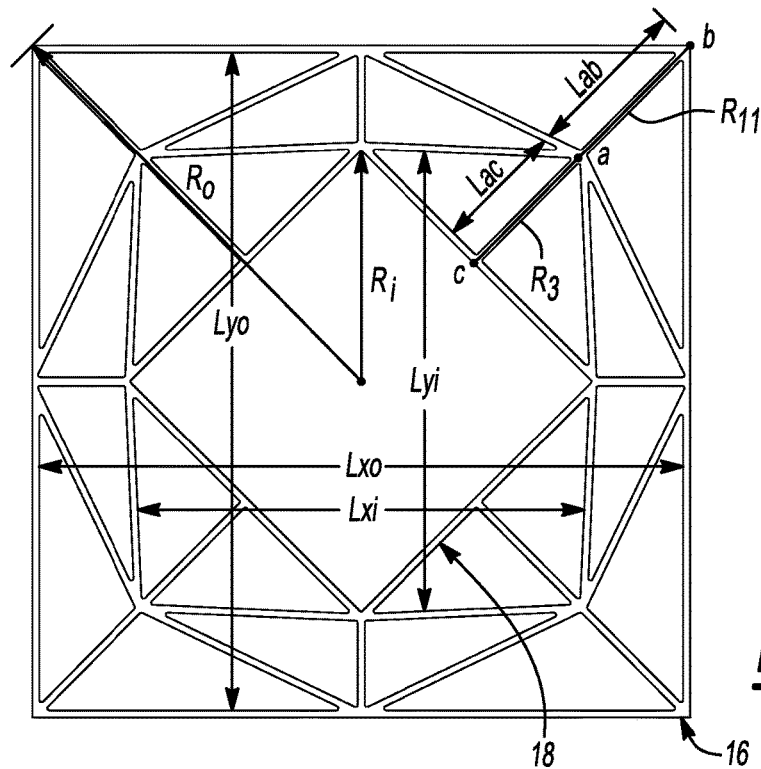
Figure 6A:
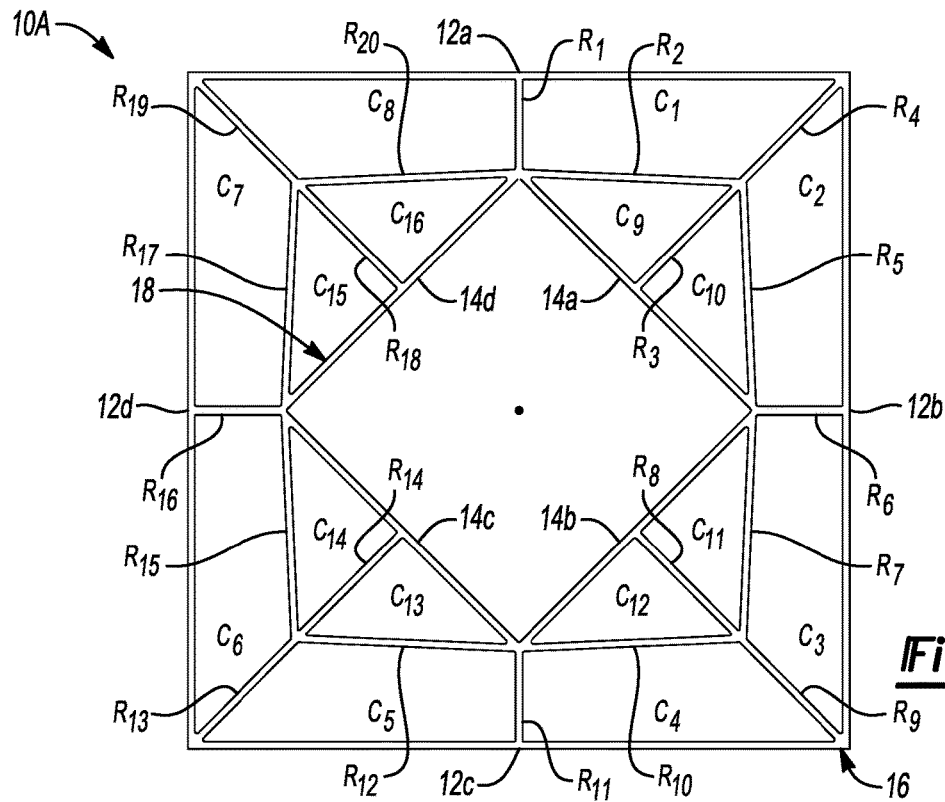
FIGS. 6A-6F are each a plan view of one of six separate alternative embodiments of a structural beam.
Figure 6B:
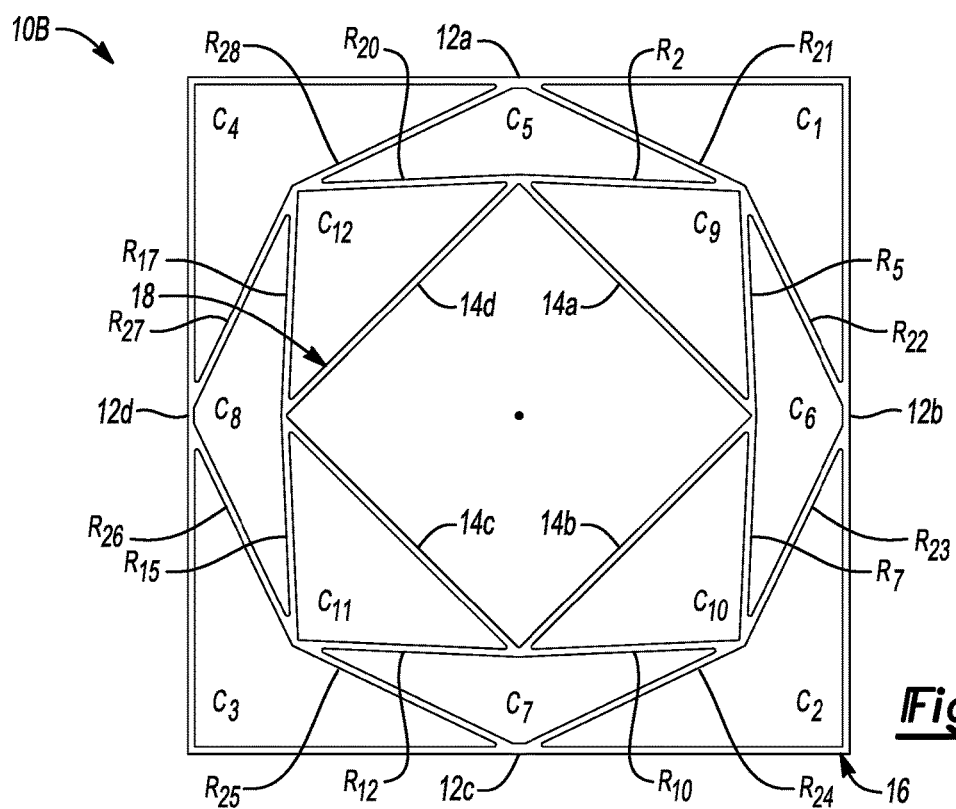
Figure 6C:
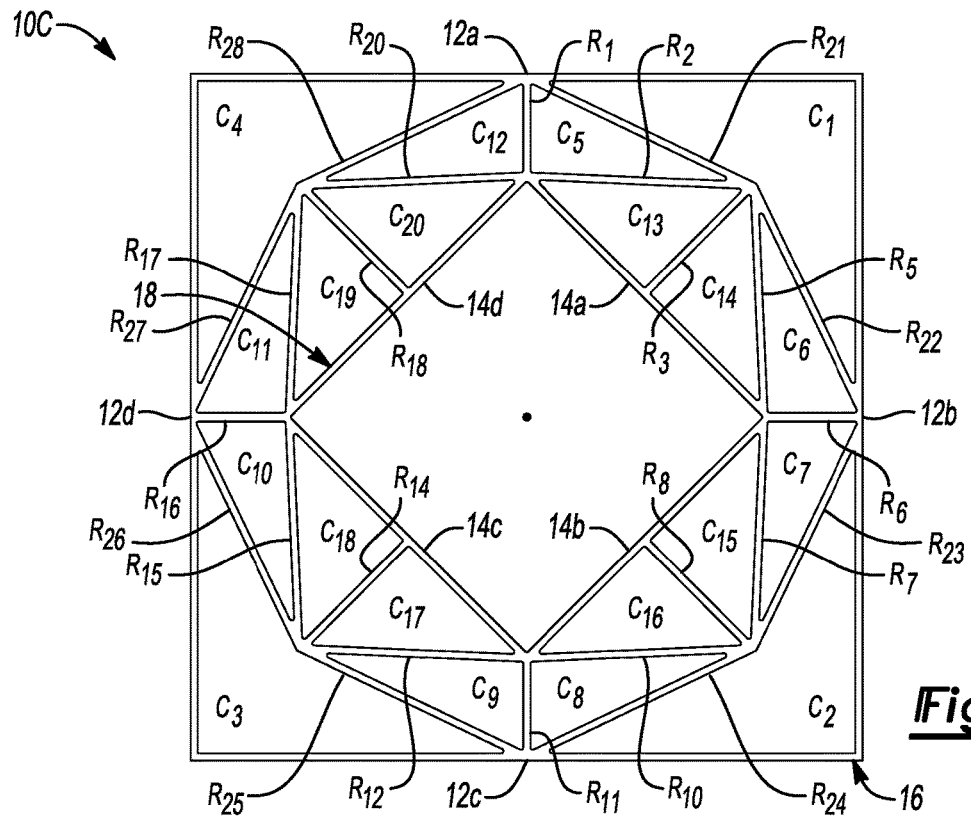
Figure 6D:
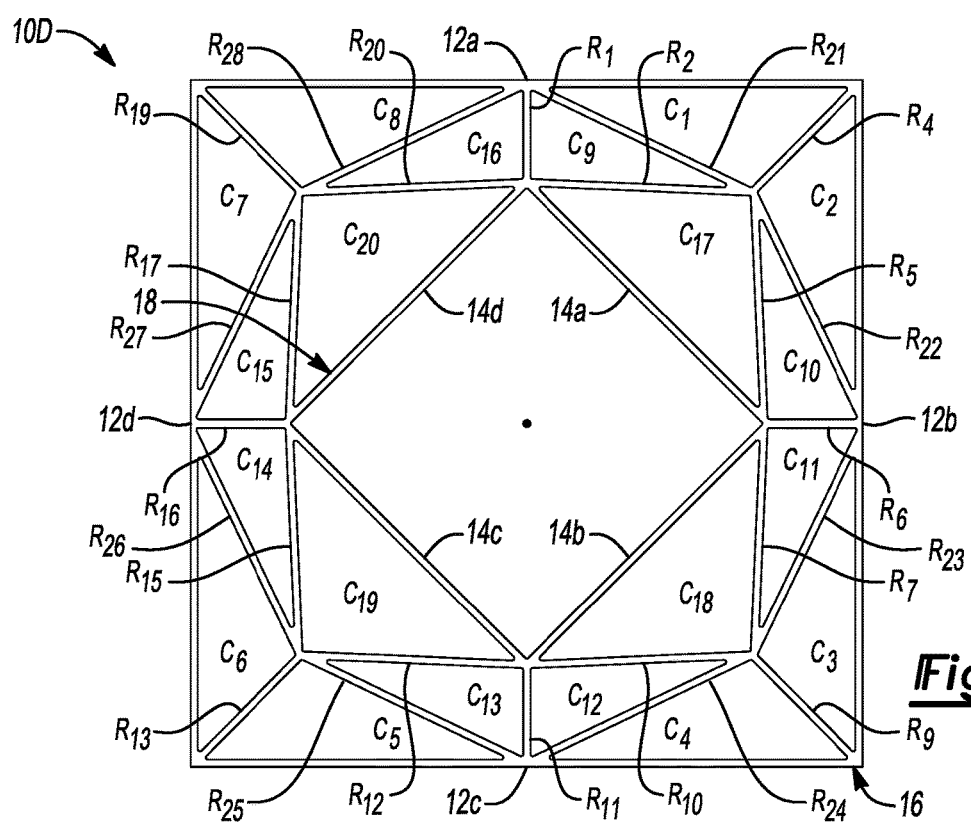
Figure 6E:
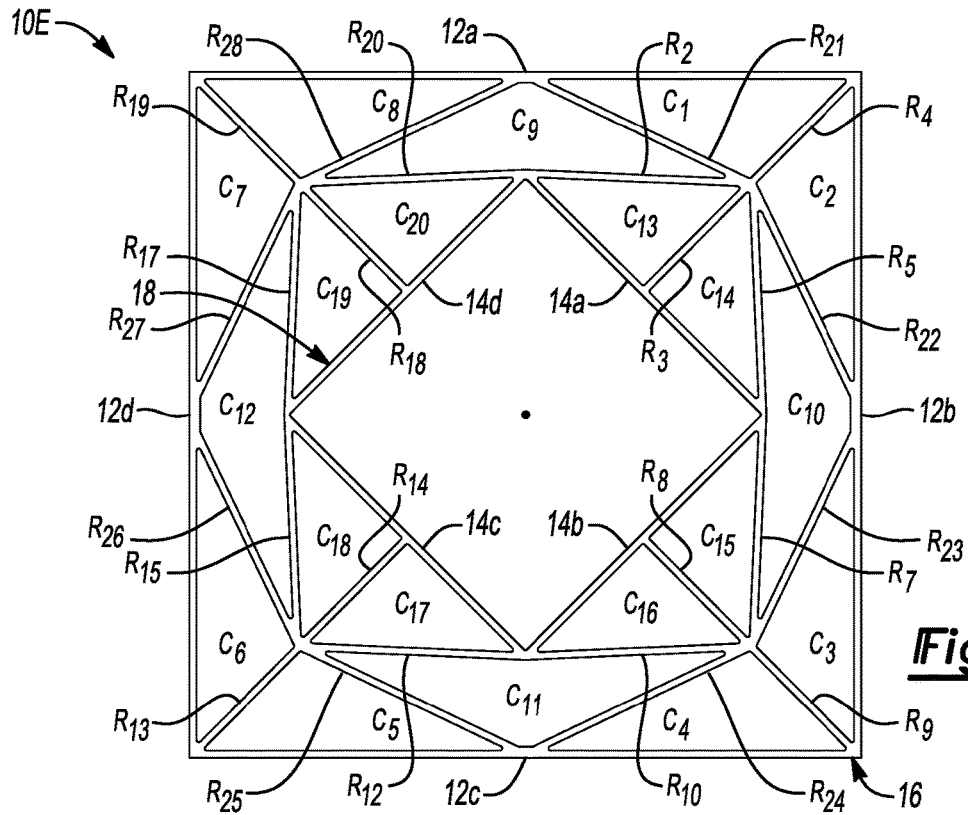
Figure 6F:
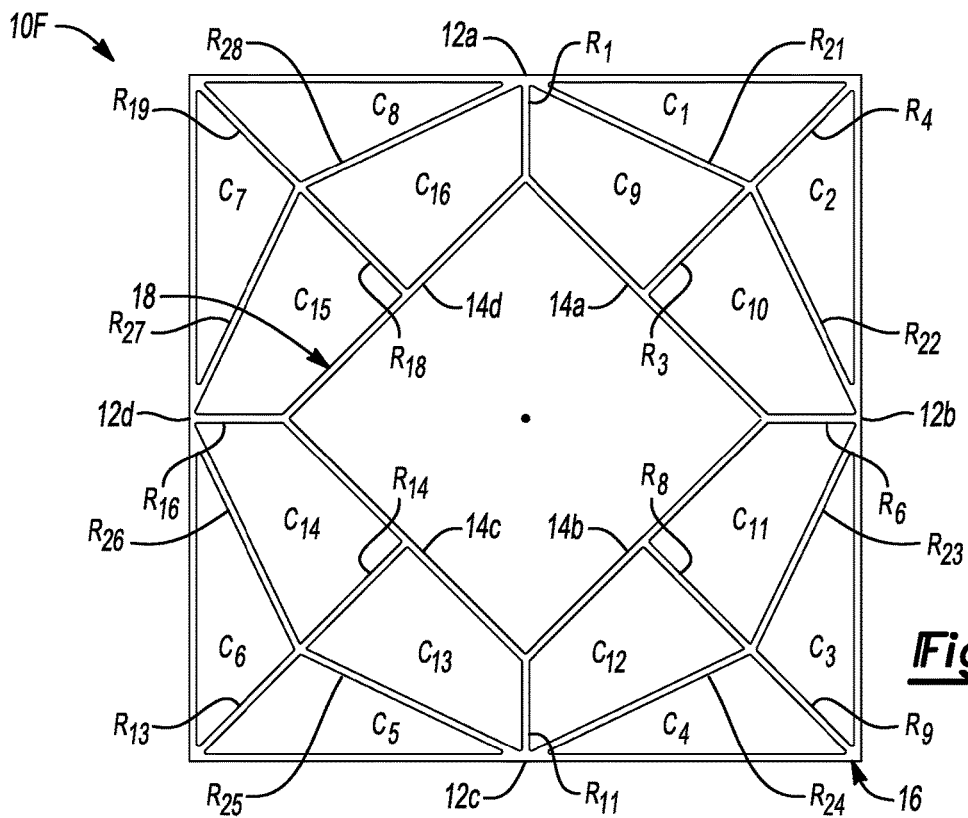

Referring to FIG. 5, the dimensions of the ribs or interstitial weblinks and the height and widths of the inner rectangular tube 18 and outer rectangular tube 16 are shown. Rib $R_4$ extends between point "a" and point "b" and may have a length $L_{ab}$. Rib $R_3$ may extend between a midpoint of one of the inner walls, labeled "c," to point "a" connecting the end of rib $R_3$ to rib $R_4$. Rib $R_3$ may have a length $L_{ac}$. Lengths of $L_{ab}$ and $L_{ac}$ may have a ratio of $$4.0 > \frac{Lab}{Lac} > 0.25.$$

The outer rectangular tube 16 may have a height $L_{yo}$, a width $L_{xo}$, and a center-to-corner dimension $R_i$. The inner rectangular tube 18 may have a height $L_{yi}$, a width $L_{xi}$, and a center-to-corner dimension $R_i$. The widths of the inner and outer tubes may have a ratio such as $$10 > \frac{Lxo}{Lxi} > 1.25.$$

Similarly, the heights of the inner and outer tubes may have a ratio such as $$10 > \frac{Lyo}{Lyi} > 1.25.$$

Similarly, the center-to-corner dimensions of the inner and outer tubes may have a ratio such as $$10 > \frac{Ro}{Ri} > 1.25.$$

The height and width of the outer tube may have an aspect ratio between $$4 > \frac{Lxo}{Lyo} > 0.25.$$

The height and width of the inner tube may have an aspect ratio between $$4 > \frac{Lxi}{Lyi} > 0.25.$$

Referring to FIGS. 6A-6F, top views of various embodiments 10A-10F of a non-parallel bi-rectangular cellular beam are illustrated. Each beam 10A-10F includes four outer walls 12a-12d that connect at four corners and four inner walls 14a-14d that connect at four corners. The four outer walls 12a-12d form an outer rectangular tube 16. The four inner walls form an inner rectangular tube 18. The inner rectangular tube 18 may be disposed within the outer rectangular tube such that the outer walls 12a-12d are non-parallel with the inner walls 14a-14d. More specifically, the inner walls 14a-14d and the outer walls 12a-12d may be oriented such that the inner walls 14a-14d are positioned at substantially 45° relative to adjacent outer walls 12a-12d. Substantially 45° may refer to any incremental value between 40° and 50°. The beams 10A-10F may include any desirable number of ribs depending on the required strength of the beam. Altering the number of ribs allows various beams having the same outer perimeter or diameter form various structural components of the same or different vehicles. Fewer ribs provides for a lighter weight beam and an increased crush distance or deflection under loads. The cellular beams with fewer ribs can be adopted in structural components that require lower crush forces or less energy absorptions. More ribs make the beam heavier and decrease the amount of crush distance or deflection under load. The cellular beams that include additional ribs can be employed in components that require higher crush forces and/or the ability to absorb additional amounts of energy. Altering the number of ribs without changing the outer perimeter or diameter not only enables scalability of the structural characteristics but also offers the opportunity to standardize structural components within the same vehicle or among different vehicles. Cellular beams having the same outer perimeter or diameter allows for the use of simplified manufacturing tooling (dies) and allows the same brackets or joints to be used when connecting adjacent components. Thus, the part, tooling, bracket costs, and design time can be reduced significantly.

The non-parallel bi-rectangular cellular beam 10A (FIG. 6A) is similar to the non-parallel bi-rectangular cellular beam 10 depicted in FIGS. 4 and 5, with the exception that ribs $R_{21}$-$R_{28}$ have been removed. Removing ribs $R_{21}$-$R_{28}$ also results an exterior layer of cells $C_1$-$C_8$ being quadrilateral in shape and an interior layer of cells $C_9$-$C_{16}$ being triangular in shape. The exterior layer of cells $C_1$-$C_8$ may form trapezoids while the interior layer of cells $C_9$-$C_{16}$ may form right triangles.

The non-parallel bi-rectangular cellular beam 10B (FIG. 6B) is similar to the non-parallel bi-rectangular cellular beam 10 depicted in FIGS. 4 and 5, with the exception that cellular beam 10B does not include any of the ribs $R_1$, $R_3$, $R_4$, $R_6$, $R_8$, $R_9$, $R_{11}$, $R_{13}$, $R_{14}$, $R_{16}$, $R_{18}$, and $R_{19}$ that extend from the inner tube 18 to the outer tube 16 in a spoke like manner. Instead all the ribs extend between either one of the inner walls 14a-14d or one of the outer walls 12a-12d and one of the other ribs. The ribs, the inner walls 14a-14d, and the outer walls 12a-12d of the non-parallel bi-rectangular cellular beam 10B form an exterior layer of concave quadrilateral cells $C_1$-$C_4$, an intermediate layer of triangular cells $C_5$-$C_8$, and an interior layer of triangular cells $C_9$-$C_{12}$. The intermediate layer of triangular cells $C_5$-$C_8$ may form isosceles triangles while the interior layer of triangular cells $C_9$-$C_{12}$. may form right triangles.

The non-parallel bi-rectangular cellular beam 10C (FIG. 6C) is similar to the non-parallel bi-rectangular cellular beam 10 depicted in FIGS. 4 and 5, with the exception that ribs $R_4$, $R_9$, $R_{13}$, and $R_{19}$ have been removed. The ribs, the inner walls 14a-14d, and the outer walls 12a-12d of the non-parallel bi-rectangular cellular beam 10C form an exterior layer of concave quadrilateral cells $C_1$-$C_4$, an intermediate layer of triangular cells $C_5$-$C_{12}$, and an interior layer of triangular cells $C_{13}$-$C_{20}$. The intermediate layer of triangular cells $C_5$-$C_{12}$ and interior layer of triangular cells $C_{13}$-$C_{20}$ may form right triangles.

The non-parallel bi-rectangular cellular beam 10D (FIG. 6D) is similar to the non-parallel bi-rectangular cellular beam 10 depicted in FIGS. 4 and 5, with the exception that ribs $R_3$, $R_8$, $R_{14}$, and $R_{18}$ have been removed. The ribs, the inner walls 14a-14d, and the outer walls 12a-12d of the non-parallel bi-rectangular cellular beam 10D form an exterior layer of triangular cells $C_1$-$C_8$, an intermediate layer of triangular cells $C_9$-$C_{16}$, and an interior layer of triangular cells $C_{17}$-$C_{20}$. The exterior layer of triangular cells $C_1$-$C_8$ may form scalene triangles, while the intermediate layer of triangular cells $C_9$-$C_{16}$ and interior layer of triangular cells $C_{17}$-$C_{20}$ may form right triangles.

The non-parallel bi-rectangular cellular beam 10E (FIG. 6E) is similar to the non-parallel bi-rectangular cellular beam 10 depicted in FIGS. 4 and 5, with the exception that ribs $R_1$, $R_6$, $R_{11}$, and $R_{16}$ have been removed. The ribs, the inner walls 14a-14d, and the outer walls 12a-12d of the non-parallel bi-rectangular cellular beam 10E form an exterior layer of triangular cells $C_1$-$C_8$, an intermediate layer of triangular cells $C_9$-$C_{12}$, and an interior layer of triangular cells $C_{13}$-$C_{20}$. The exterior layer of triangular cells $C_1$-$C_8$ may form scalene triangles, the intermediate layer of triangular cells $C_9$-$C_{12}$ may form isosceles triangles, and the interior layer of triangular cells $C_{13}$-$C_{20}$ may form right triangles.

The non-parallel bi-rectangular cellular beam 10F (FIG. 6F) is similar to the non-parallel bi-rectangular cellular beam 10 depicted in FIGS. 4 and 5, with the exception that ribs $R_2$, $R_5$, $R_7$, $R_{10}$, $R_{12}$, $R_{15}$, $R_{17}$, and $R_{20}$ have been deleted. The ribs, the inner walls 14a-14d, and the outer walls 12a-12d of the non-parallel bi-rectangular cellular beam 10F form an exterior layer of triangular cells $C_1$-$C_8$ and an interior layer of convex quadrilateral cells $C_9$-$C_{16}$. The exterior layer of triangular cells $C_1$-$C_8$ may form scalene triangles.

Those of ordinary skill in the art would understand, however, that FIGS. 6A-6F are exemplary only, and are provided merely to illustrate how design parameters can be utilized to modulate the cross-section of the exemplary embodiment of FIG. 4. Thus, as above, the present teachings contemplate various cellular cross-sectional configurations having various shapes and dimensions (i.e., corner bend radii, side lengths and/or thicknesses), which can be adjusted based on space requirements, strength targets, crush distances, energy absorption, and/or to control member collapse modes.

In some exemplary embodiments, some or all of the cells of an exemplary cellular structure may be partially or wholly filled with various fillers. For example, where temperature control is desired, some or all of the cells may be partially or wholly filled with thermally insulating fillers. Exemplary thermally insulating fillers include various foams including blown fiber glass foam, polyurethane foams, mineral wool, cellulose, polystyrene aerogels, cork, or any combination thereof. In other various exemplary embodiments, where sound control is required, some or all of the cells of the exemplary cellular structures may be partially or wholly filled with noise insulating fillers. Exemplary noise insulating fillers include sponges, melamine acoustic foams, mineral wool, open-cell rubber foams, or any combination thereof.

In further various exemplary embodiments, where further structural reinforcement is desired, the cells may be partially or wholly filled with strengthening fillers. Exemplary strengthening fillers include structural foams, thermoplastic structural foams, aluminum foams, glass or carbon fiber-reinforced structural foams, closed-cell polymer foams, and any combination thereof. In some exemplary embodiments, more than one type of filler may be incorporated in the cells. In some other exemplary embodiments, a filler may provide more than one of the thermally insulating, noise insulating, and strengthening functions. A filler may partially or wholly fill some or all of the cells of the exemplary cellular structures. Alternatively, some or all of the cells may be left unfilled (i.e., hollow or empty).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle beam comprising:
   outer and inner tubes respectively having outer and inner sets of walls that respectively form outer and inner rectangles, wherein the inner tube is disposed within the outer tube such that the outer set of walls are non-parallel with the inner set of walls; and
   a plurality of ribs, each rib disposed between and having an end secured to one of the outer and inner sets of walls, wherein the plurality of ribs includes a subset set of ribs, and wherein each rib of the subset set of ribs extends from a corner of the outer tube to a midpoint of one of the inner walls.

2. The beam of claim 1, wherein the inner and outer walls are oriented such that the inner walls are positioned at substantially 45° relative to adjacent outer walls.

3. The beam of claim 1, wherein the plurality of ribs includes a subset of ribs, and wherein each rib of the subset of ribs extends from a corner of the inner tube to a midpoint of one of the outer walls.

4. The beam of claim 1, wherein the plurality of ribs includes a subset of ribs, and wherein each rib of the subset of ribs extends between one of the outer and inner tubes and another of the plurality of ribs.

5. The beam of claim 1, wherein the plurality of ribs and at least one of the outer tube and the inner tube define a plurality of triangular cells between the outer and inner tubes.

6. The beam of claim 5, wherein the plurality of ribs and at least one of the outer tube and the inner tube also define a plurality of quadrilateral cells between the outer and inner tubes.

7. The beam of claim 6, wherein the plurality of quadrilateral cells are convex quadrilaterals.

8. The beam of claim 6, wherein the plurality of quadrilateral cells are concave quadrilaterals.

9. A vehicle bumper support beam comprising:
   four outer and four inner walls respectively forming outer and inner rectangular tubes, wherein the inner tube is disposed within the outer tube such that the outer walls are non-parallel with the inner walls; and
   a plurality of ribs disposed between the outer and inner walls and arranged to define a plurality of triangular cells and a plurality of concave quadrilateral cells between the outer and inner tubes.

10. The beam of claim 9, wherein the inner and outer walls are oriented such that the inner walls are positioned at substantially 45° relative to adjacent outer walls.

11. The beam of claim 9, wherein the plurality of ribs is arranged to define a plurality of convex quadrilateral cells.

12. The beam of claim 9, wherein the plurality of ribs includes a subset of ribs, and wherein each rib of the subset of ribs extends from a corner of the inner tube to a midpoint of one of the outer walls.

13. The beam of claim 9, wherein the plurality of ribs includes a subset set of ribs, and wherein each rib of the subset set of ribs extends from a corner of the outer tube to a midpoint of one of the inner walls.

14. A vehicle structural member comprising:
   four outer and four inner walls respectively forming outer and inner square tubes, wherein the inner and outer walls are oriented such that the inner walls are positioned at substantially 45° relative to adjacent outer walls; and
   a plurality of ribs disposed between the outer and inner walls and arranged to define a plurality of triangular cells between the outer and inner tubes, wherein the plurality of ribs includes first and second subsets of ribs, and wherein each rib of the first subset of ribs extends from a corner of the inner tube to a midpoint of one of the outer walls and each rib of the second subset set of ribs extends from a corner of the outer tube to a midpoint of one of the inner walls.

15. The member of claim 14, wherein the plurality of ribs includes a third subset of ribs, and wherein each rib of the third subset of ribs extends between one of the outer and inner tubes and another of the plurality of ribs.

16. The member of claim 14, wherein the plurality of ribs is arranged to define a plurality of quadrilateral cells between the outer and inner tubes.

17. The member of claim 16, wherein the plurality of quadrilateral cells are convex quadrilaterals.

18. The member of claim 16, wherein the plurality of quadrilateral cells are concave quadrilaterals.

* * * * *